United States Patent [19]

Soga

[11] Patent Number: 5,546,585
[45] Date of Patent: Aug. 13, 1996

[54] PERSONAL COMPUTER SYSTEM WITH START-UP CAPABILITY FROM AN EXTERNAL MASS STORAGE DEVICE

[75] Inventor: Takumi Soga, Tokyo, Japan

[73] Assignee: Olympus Optical Co., Ltd., Tokyo, Japan

[21] Appl. No.: 42,793

[22] Filed: Apr. 6, 1993

[30] Foreign Application Priority Data

Apr. 8, 1992 [JP] Japan .................... 4-086923

[51] Int. Cl.⁶ ..................... G06F 9/24
[52] U.S. Cl. ..................... 395/700
[58] Field of Search ..................... 395/650, 700

[56] References Cited

U.S. PATENT DOCUMENTS

| | | | |
|---|---|---|---|
| 4,920,481 | 4/1990 | Binkley et al. | 395/500 |
| 4,939,507 | 7/1990 | Beard et al. | 395/500 |
| 5,062,042 | 10/1991 | Binkley et al. | 395/600 |

Primary Examiner—Alvin E. Oberley
Assistant Examiner—John Q. Chavis
Attorney, Agent, or Firm—Watson Cole Stevens Davis, P.L.L.C.

[57] ABSTRACT

A virtual floppy disk region having the same contents as that of a floppy disk for starting is provided to a magneto-optic recording playback device (MO) as an external mass storage device of a personal computer, and makes the system start-up from the OS stored therein possible. A MO 18 which conforms to SCSI comprises a media-region management information storage region 18a, a virtual floppy disk region 18b having a storage capacity the same as that of a floppy disk, and a user's region 18c which stores data and programs and has a large storage capacity equal to or more than a hard disk. The virtual floppy disk region 18b is stored with a starting program which is the same as a starting disk and a device driver 20 for the MO's use. Also, a virtual floppy BIOS which is a program for calling the virtual floppy disk region 18b at the time of system starting is provided separately.

10 Claims, 7 Drawing Sheets

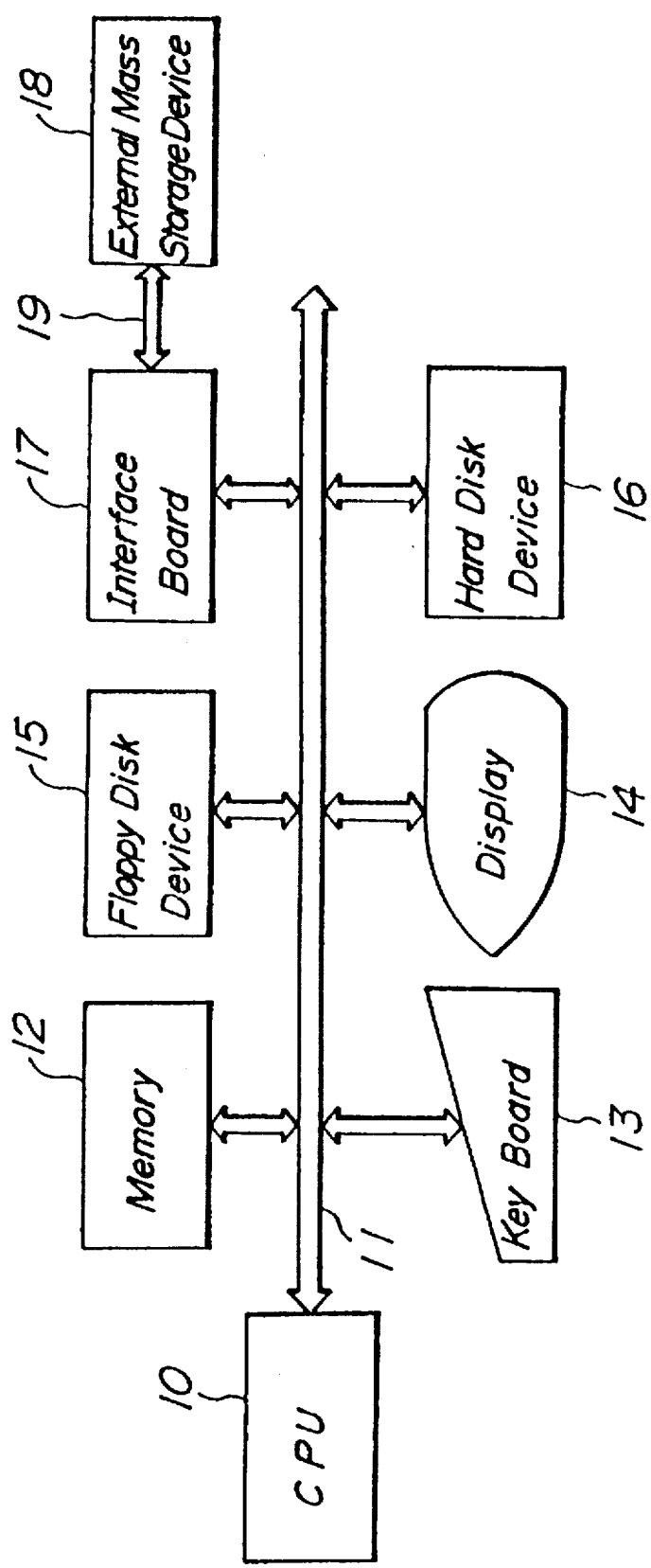
FIG_1

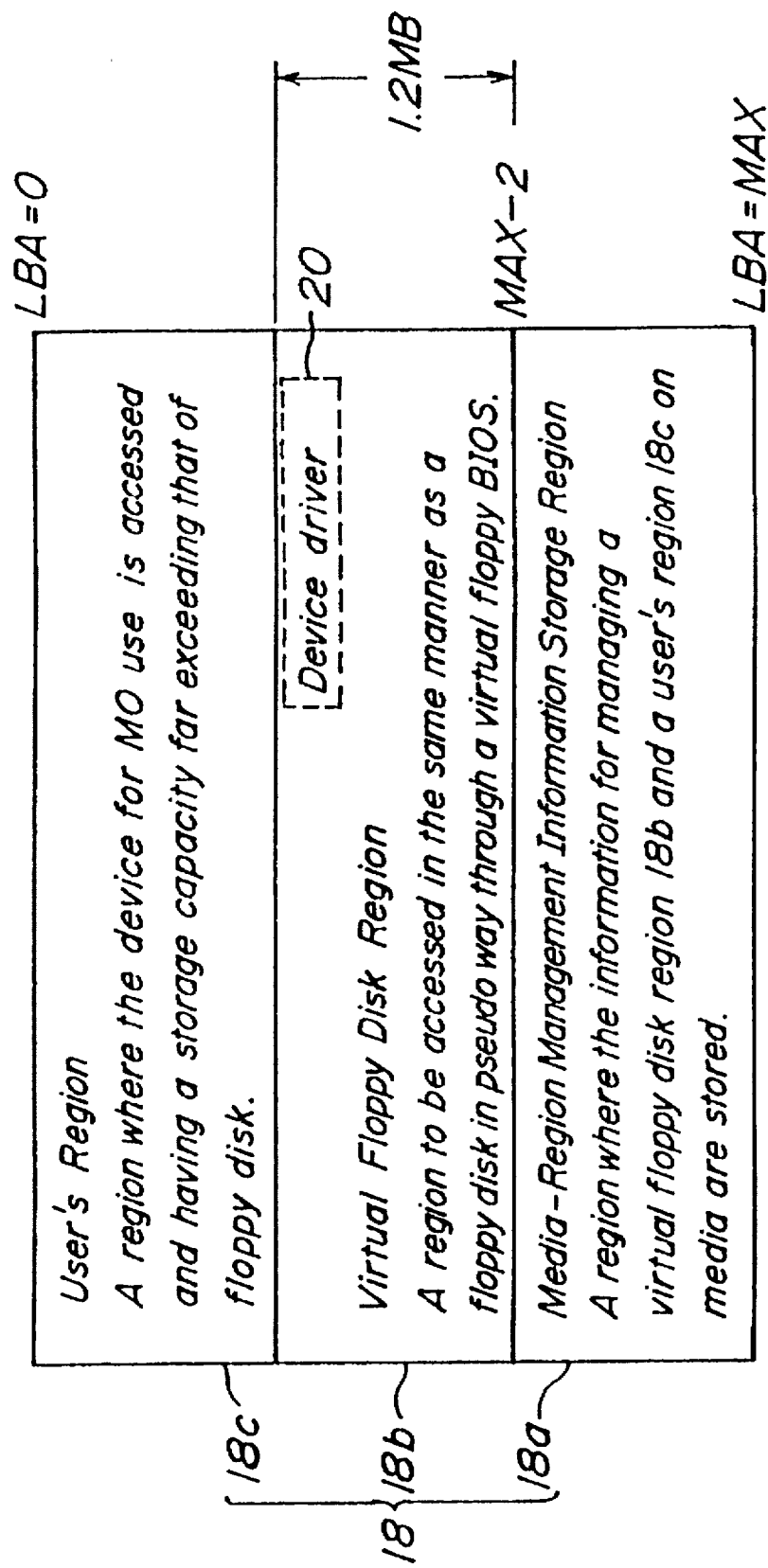
FIG_2

FIG_3
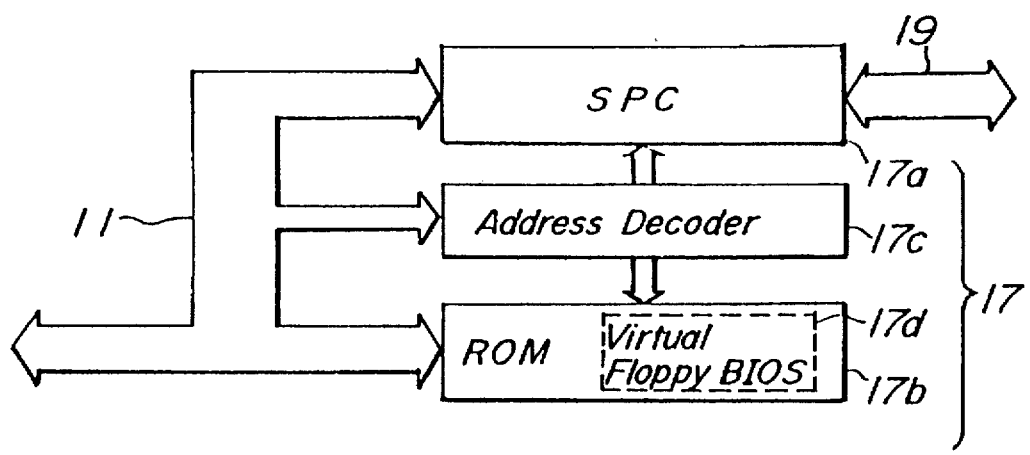

FIG_4
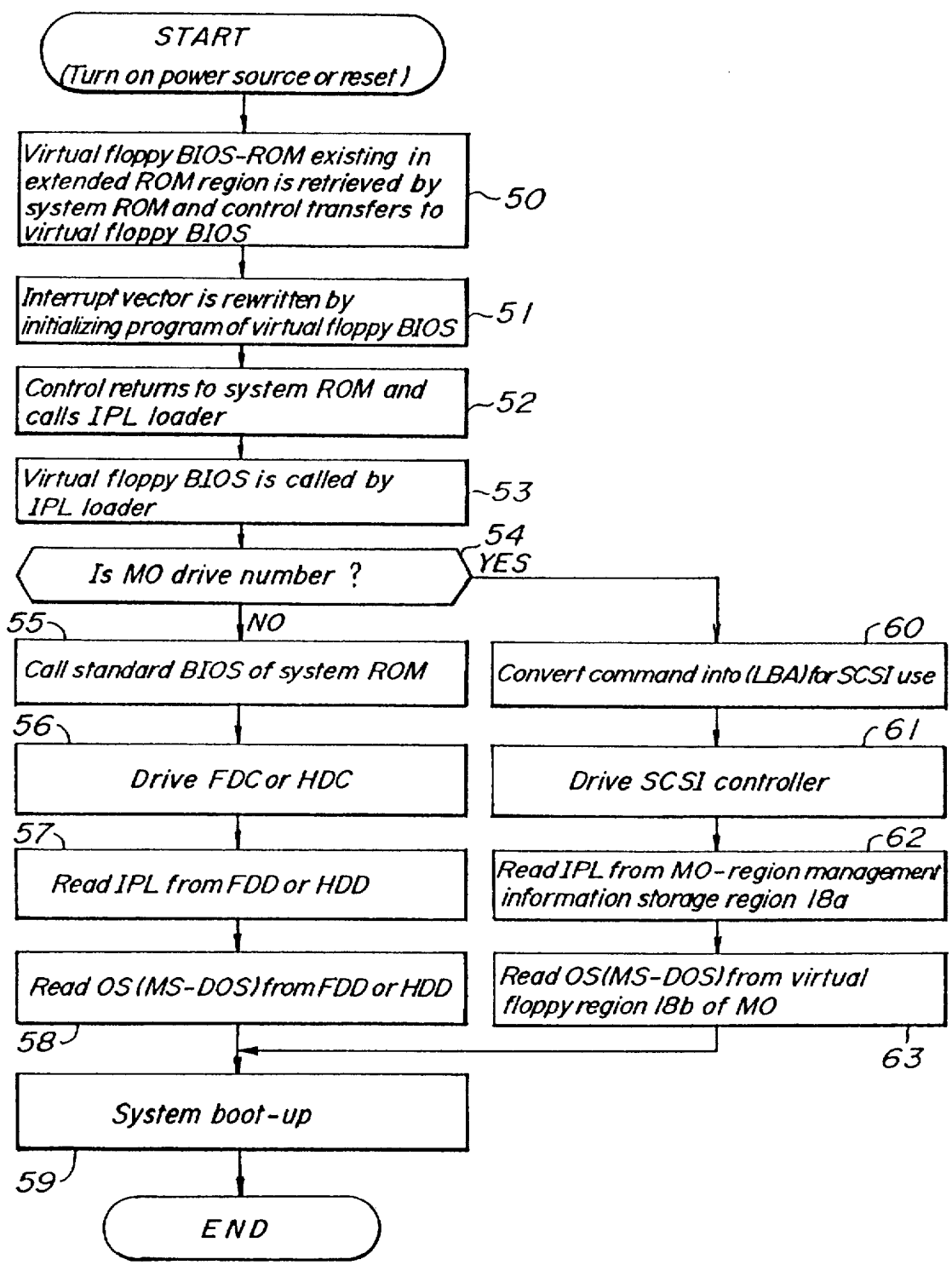

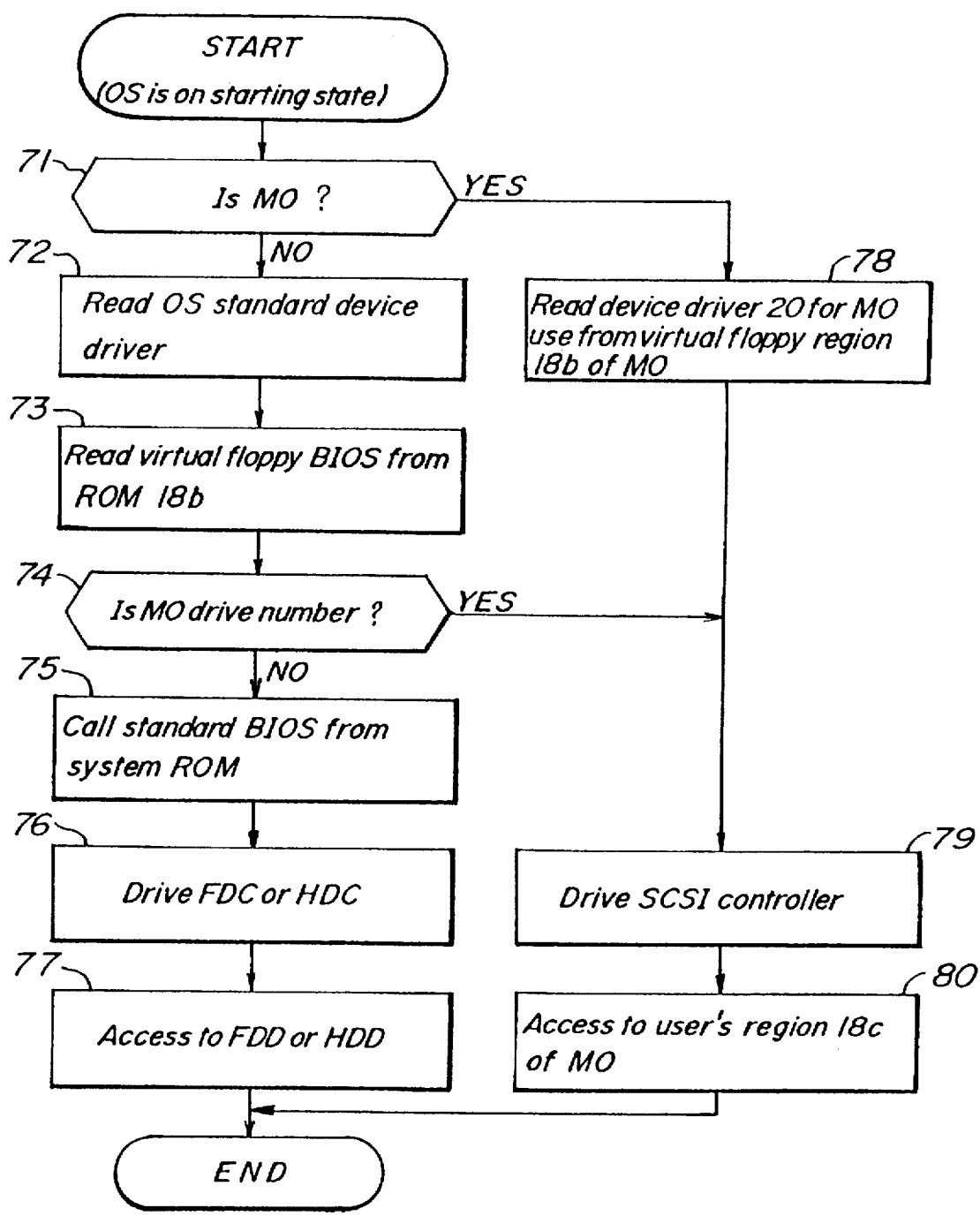
FIG_5

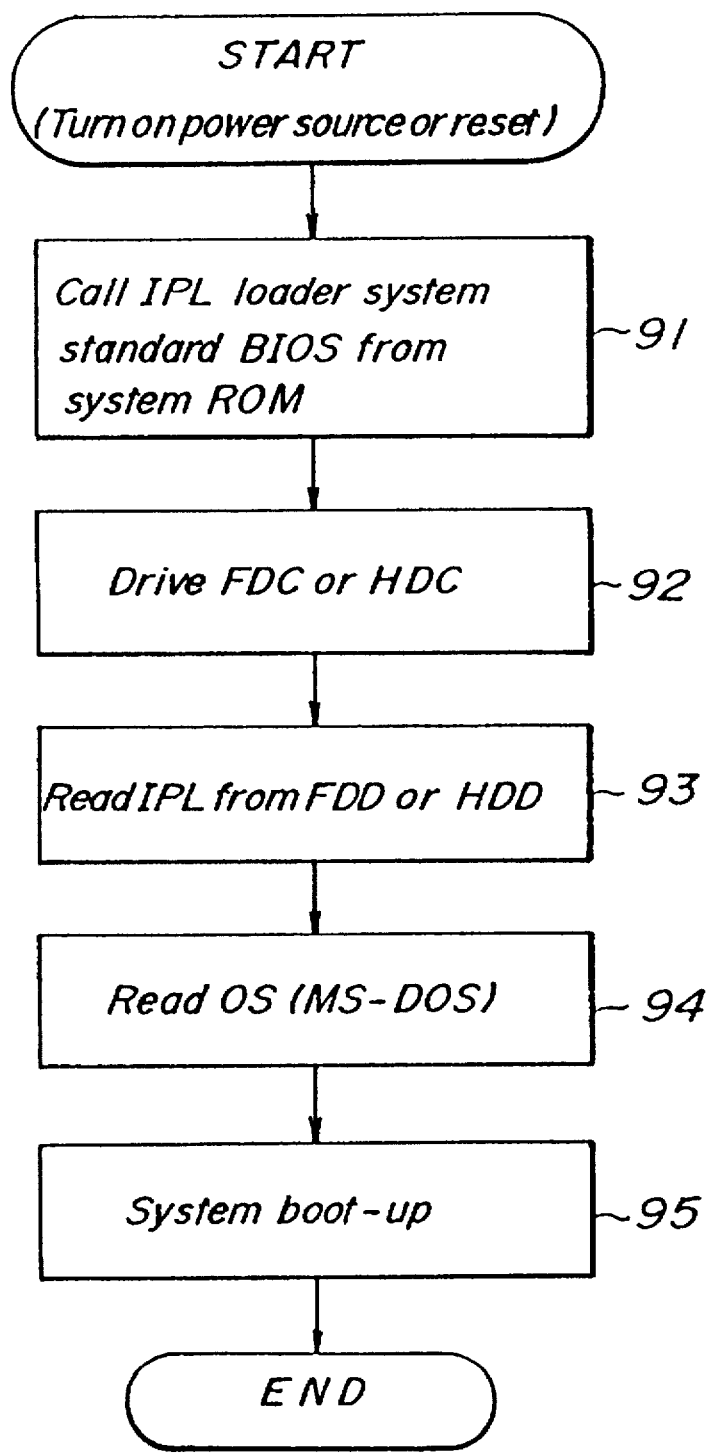

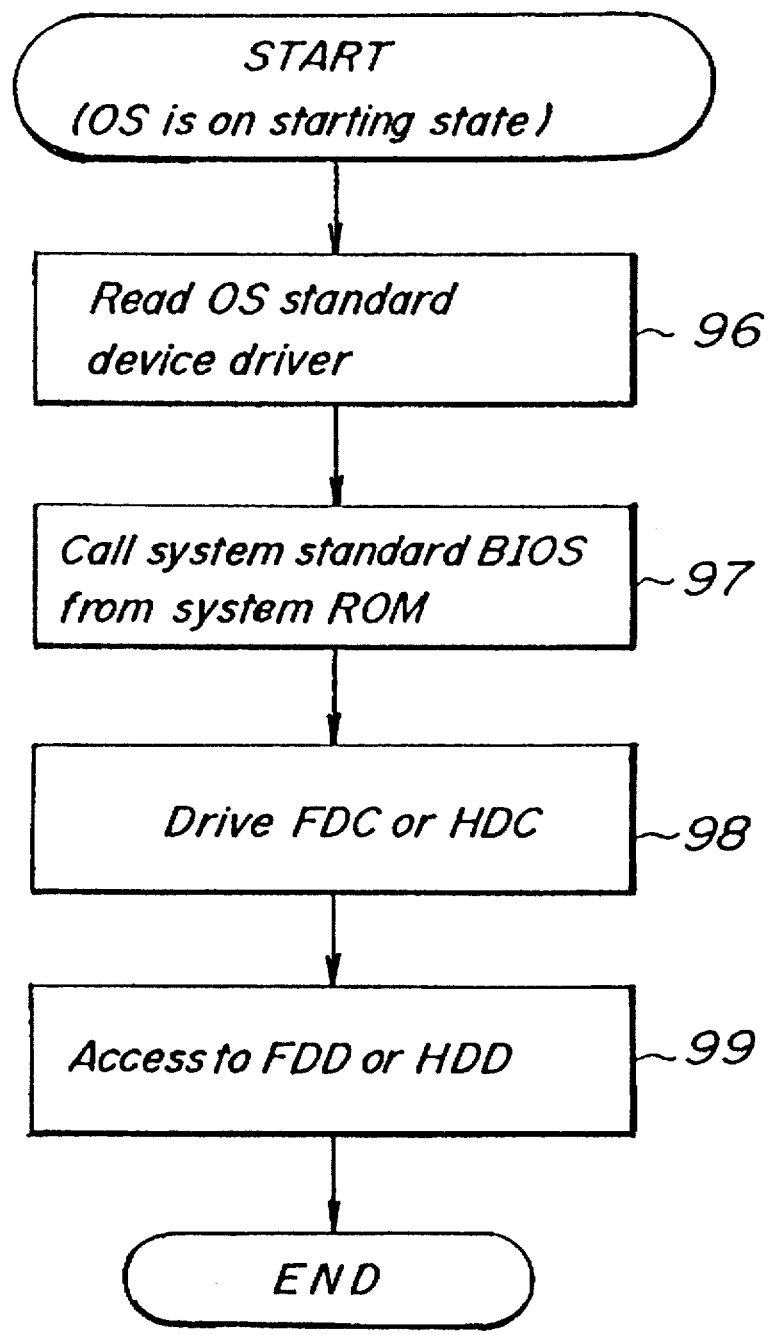

PERSONAL COMPUTER SYSTEM WITH START-UP CAPABILITY FROM AN EXTERNAL MASS STORAGE DEVICE

BACKGROUND OF THE INVENTION

1. Field of the Invention

The invention relates to a personal computer system where each external mass storage devices has a system boot-up function, equivalent to a floppy disk, used to boot-up the system.

2. Description of the Related Art

In recent years, personal computers have become widespread and are commonly used in both home and office environments. In order to facilitate this growth in the use of computers, the connection of various external devices to the computer via interface boards has become quite common.

One external device often connected to personal computers is the external mass storage device. Common devices used for the external mass storage device include Hard Disk Drives (HDD), Magneto-Optic recording and playback systems (MO), and the like.

These external mass storage devices may be utilized in various ways suitable for respective devices. For instance, the hard disk device and magneto-optic recording and playback device have large storage capacity, and thus are suitable for storing a plurality of application programs and/or a large amount of data. Therefore, in a personal computer system including these external mass storage devices, the devices are selectively used.

The system boot-up of a personal computer is carried out as following. For example, in a personal computer of the kind which incorporates a floppy disk drive and a hard disk drive and employs MS-DOS (an operating system developed by MICROSOFT CORPORATION, in USA; a registered Trademark) as an operating system (OS), at first, an IPL loader (Initial Program Loader) stored in a system ROM of the personal computer is started by turning on the power supply or by resetting the system. The IPL loader reads the IPL (initial load program) into an internal memory of the personal computer from the floppy disk drive or the hard disk drive (the floppy disk drive has priority) through a standard BIOS, thereby the control transfers to the IPL, and the IPL reads the MS-DOS as the OS into the memory from the floppy disk drive or the hard disk drive (the floppy disk drive has priority), then the control transfers to MS-DOS, and consequently MS-DOS is started.

When MS-DOS is in a boot-up state, the external mass storage device described above can be placed under the control of the MS-DOS by either of the following methods.

The first method is the one in which a device driver (a program for placing the external device under the control of OS) corresponding to the external mass storage device is read from the floppy disk or the hard disk drive to control the external mass storage device by this device driver.

The second method is the one in which, in a case for example, where a magneto-optic recording playback device is used as an external mass storage device, in order to handle this magneto-optic recording playback device in a pseudo fashion as a hard disk drive, the system standard BIOS stored in the system ROM of the personal computer is replaced with a BIOS, newly provided on an interface board, so that a command for the hard disk drive is converted into a command for the magneto-optic recording playback device.

The first method is a most simple and ordinary method for connecting the external mass storage device with the personal computer. However, reading of the device driver is required to be carried out from a device (FDD or HDD) other than the external mass storage device before the external mass storage device is placed under the control of said OS (MS-DOS), notwithstanding, that the hardware (standard BIOS) of the personal computer is set so that the OS is read from the FDD or HDD by all means immediately after turning on the power supply or resetting the system, so that the system boot-up can not be performed from the external mass storage device itself.

In addition, since the second method recognizes the external mass storage device as a hard disk drive in a pseudo manner, the system boot-up can be performed by reading OS from this external mass storage device; however, this can not avoid a restriction for the hard disk drive in the OS (MS-DOS) that the external mass storage device after exchanging of media is not recognized as a formal external mass storage device. Due to this restriction, for example, in a case where a plurality of magneto-optic recording playback devices are media-exchanged and used as a proper external mass storage device, if the media exchange is forced as it is, normal access can not be performed and the external mass storage device and data therein tend to be broken. As a result, restarting must be done by resetting the system when the media exchange is performed after all. This arrangement therefore can not exhibit the ability to exchange media that is an advantage of the magneto-optic recording playback device.

SUMMARY OF THE INVENTION

An object of the present invention is to provide a novel and useful personal computer system with a faculty for accessing external mass storage devices and being capable of making a system boot-up function and a media exchanging function co-exist.

To achieve this object, a personal computer system whose system is booted-up in accordance with a system boot-up program stored in a storage medium such as a floppy disk and the like, comprises:

an external mass storage device having a storage capacity exceeding that of a floppy disk;

a virtual floppy disk region having the same storage capacity as a floppy disk and being stored with the system boot-up program and provided on a part of a storage region of the external mass storage device, and an auxiliary program for reading the system boot-up program from the virtual floppy disk region at the time of system boot-up.

According to the invention, an external mass storage device having storage capacity exceeding that of a floppy disk is connected to a personal computer whose system is booted-up in accordance with a system boot-up program stored in storage medium such as a floppy disk and the like, by providing a virtual floppy disk region having the same storage capacity as the floppy disk on a part of the storage region of the external mass storage device, the system boot-up program being stored therein, and an auxiliary program for reading the system boot-up program from the virtual floppy disk region at the time of system boot-up is provided, thereby a system boot-up function and a media exchanging function co-exist in the external mass storage device, and thus the media exchange of the external mass storage device can be performed freely after booting-up the system.

BRIEF DESCRIPTION OF THE DRAWINGS

FIG. 1 is a device structure diagram illustrating the overall structure of the first embodiment of the personal computer system according to the present invention.

FIG. 2 is a table showing the storage regions of a magneto-optic recording playback device as an external mass storage device used in the first embodiment.

FIG. 3 is a device structure diagram illustrating the overall structure of the interface board used in the first embodiment of the invention.

FIG. 4 is a flow chart illustrating the process used to implement system boot-up in the first embodiment of the invention.

FIG. 5 is a flow chart illustrating the process used to access an external mass storage device by the interface board used in the first embodiment of the invention.

FIG. 6 is a flow chart illustrating the process used to implement system boot-up in a conventional personal computer system.

FIG. 7 is a flow chart illustrating the process used to access an external mass storage device in a conventional personal computer system.

DETAILED DESCRIPTION OF THE PREFERRED EMBODIMENTS

FIG. 1 is a device structure diagram illustrating the overall structure of an embodiment of the personal computer system with an external mass storage device according to the present invention, where numeral 10 depicts a CPU. The personal computers referred to in the description of the embodiment of the invention will be personal computers designed to operate in an MS-DOS environment, with Version 3.x as the operating system.

The CPU 10 can be implemented using a microprocessor such as the V30, 8086, 8088, 80286, 80386 or other more powerful microprocessor conforming to the 80386 architecture. The CPU 10 is connected, through a system bus 11, with system memory 12, a key board 13, a display 14, a floppy disk drive (FDD) 15, and a hard disk drive (HDD) 16, and further, connected through an interface board 17 and a SCSI bus 19, with a magneto-optic recording playback device (MO) 18 which is provided as an external mass storage device.

The overall structure of the interface board 17 used in the present embodiment of the invention, as illustrated in FIG. 3, includes a SCSI protocol controller 17a, hereinafter referred to as "SPC 17a", a ROM 17b, an address decoder 17c with a circuit to assign the SPC 17a and ROM 17b to a predetermined address in the system memory 12 of the personal computer. The SPC 17a and address decoder 17c constitute an extended interface circuit. The ROM 17b has a virtual floppy BIOS 17d previously written therein.

The SPC 17a of the interface board 17 is connected to a SCSI bus 19, and this SCSI bus 19 is connected to the external mass storage device 18. A magneto-optic recording playback device (MO), with a control interface conforming to the SCSI standard, is used as external mass storage device 18 as described above. In the case where the personal computer incorporates a floppy disk drive 15 and a hard disk drive 16, a device with a control interface conforming to the SCSI standard, such as an auxiliary floppy disk drive, an auxiliary hard disk drive, and the like, may be used as external mass storage device 18.

The storage region of the magneto-optic recording playback device 18 is partitioned in the manner illustrated in the table shown in FIG. 2. The region from the most significant address (LBA=MAX) to a predetermined storage capacity, for example a region up to "LBA=MAX-2", is assigned to a media-region management information storage region 18a. This region stores the operating instructions used to control the Virtual Floppy Disk Region 18b and the User's Region 18c of the magneto-optic recording playback device 18. The function of these Regions will be described later.

A region with the same storage capacity as the formatted capacity of a standard floppy disk (in this example a 1.2 MByte floppy disk, but the capacity may be 1.44 MByte, depending on the kind of personal computer) is assigned to a Virtual Floppy Disk Region 18b. The position of this storage region has a lower order address than the Media Region Management Information Storage Region 18a. The operating system used to initialize the computer system is stored in the Virtual Floppy Disk Region 18b. The contents of this region are exactly the same contents as a typical boot-able floppy disk with the addition of a device driver 20 to control the operation of the magneto-optic recording playback device 18.

The User's Region 18c is positioned at a lower order address than the Virtual Floppy Disk Region 18b. This region is used to store data and programs and has a storage capacity several hundred MBytes in size, far exceeding that of a floppy disk, and equal to or exceeding that of a normal hard disk drive.

The operation of the present embodiment of the invention will be described for operation on a personal computer system from the power-up of the magneto-optic recording playback device 18 to the point in time when access to the device is available to the operating system. At first, a conventional example on a general personal computer will be described with reference to the flow charts in FIGS. 6 and 7.

The flow chart of FIG. 6 begins when the power source is turned on or when the system is reset. In the next step 91, a IPL loader and a standard system BIOS stored in a system ROM of the personal computer which includes the basic instructions necessary for the control of FDD and/or HDD operation are accessed.

In step 92, the IPL loader accesses the floppy disk controller FDC or the hard disk controller HDC using the standard system BIOS. Normally the floppy disk drive has priority, and is thus referred to throughout this specification.

In step 93, IPL (initial program loader) is read from the floppy disk drive or the hard disk drive into the system memory inside the personal computer, and the control of the FDC and HDC transfers from the IPL loader contained in the system BIOS to the IPL itself.

In step 94, this IPL reads the OS (MS-DOS) from the floppy disk drive or the hard disk drive by using the system standard BIOS, and the system boot-up is performed by this OS in step 95.

When the system boot-up is completed as described above, in step 96 of the flow chart in FIG. 7, the OS standard device driver is read, for example, from the memory. Next, in step 97, this OS standard device driver calls the system standard BIOS in a similar manner as described above, the FDC or HDC is driven by using the system standard BIOS in step 98, and through this drive, access is performed to the storage region of the floppy disk drive or the hard disk drive in step 99.

On the other hand, in the present embodiment of the invention, as shown in the flowchart of FIG. 4, when the system power source is turned on or the system is reset, in step 50, an extended ROM region is retrieved in accordance with a program within system ROM of the personal computer, and when an executable program (virtual floppy BIOS 17*d* in this embodiment) is found by such retrieval, the control proceeds to the program. In step 51, an interrupt vector is rewritten in accordance with an initializing program of the virtual floppy BIOS 17*d* so that the control transfers to the virtual floppy BIOS itself.

In this connection, the word "interrupt vector" means a table stored with addresses to be called, which is referred to when significant programs such as IPL loader, IPL, OS standard device driver and the like call the BIOS of said storage medium. Therefore, after the control returns to the system ROM again, the IPL loader is called and the control proceeds to the IPL loader by rewriting the interrupt vector in step 52. In step 53, when the system standard BIOS is called by the software interrupt of the IPL loader, the virtual floppy BIOS 17*d* is called instead thereof, and the control proceeds to the virtual floppy BIOS 17*d*.

In this virtual floppy BIOS 17*d*, the drive number which is being called is checked in step 54. Steps 55 to 59 are executed to perform ordinary system start-up which is the same as in FIG. 6, when the drive number corresponds to the ordinary floppy disk drive 15 or hard disk drive 16; however, when the drive number corresponds to the magneto-optic recording playback device 18, which is the external mass storage device in the present embodiment, the magneto-optic recording playback device 18 can be treated as if it is a floppy disk by executing step 60 and steps subsequent thereto.

More specifically, in step 60, the command (for example, the track number, sector number), from the significant program, written for the specification for the floppy disk drive 15 is converted into a LBA (logical block address) which corresponds to the specifications of the magneto-optic recording playback device which conforms to SCSI, and through this LBA, in step 61, a SCSI protocol controller (SPC) 17*a* is driven.

Following this drive, in step 62, the IPL is read into the internal memory of the personal computer from the media-region management information storage region 18*a* of the magneto-optic recording playback device 18, and the control proceeds to the IPL. In step 63, this IPL reads the OS (MS-DOS) from the virtual floppy disk region 17*b* of the magneto-optic recording playback device 18, and then system start-up is achieved by this OS in step 59. It is needless to say that at the time of the reading described above, a conversion from the execution result (status) to the floppy specification is performed.

Once the system boot-up is completed in this way, the control proceeds to the flow chart in FIG. 5. At first, in step 71, the discrimination of the kind of storage medium under starting now is carried out, for example, by the drive number. In this discrimination, if it is not the magneto-optic recording playback device 18 (e.g. if it is the floppy disk drive 15, hard disk drive 16 or the like), the control proceeds to step 72, and if it is the magneto-optic recording playback device 18, the control proceeds to step 78 and steps subsequent thereto.

Here, in the case where the control proceeds to step 72, the same controls as in steps 96 to 99 in FIG. 7 are carried out except that steps 73 and 74, having the same contents as steps 53 and 54 in FIG. 4, are added, thereby access to the floppy disk drive 15 or the hard disk drive 16 is carried out by using the system standard BIOS (for FDD use / for HDD use) which has been called by the OS standard device driver, as usual.

On the other hand, in the case where the control proceeds to step 78, the device driver 20 to be used for the MO is read from the virtual floppy disk region 18*b* of the magneto-optic recording playback device 18 itself in step 78, and in step 79, the SCSI protocol controller (SPC) 17*a* is driven by this MO device driver 20.

In step 80, following this drive, the required access is made to user's region 18*c* of the magneto-optic recording playback device, which has a large storage capacity far exceeding that of the floppy disk.

In this connection, as described above, the access device of the external mass storage device according to the present embodiment can be seen that its profile in appearance, viewed from the hardware or significant programs, is the same as the floppy disk drive, therefore even when media conversion has been performed, the magneto-optic recording playback device 18, as an external mass storage device, can be started by recognizing it as a normal storage medium.

Accordingly, the trouble, which occurs when the external mass storage device is treated by judging it as a hard disk drive, that media exchange can not be performed even if starting can be done, and the trouble of the case where the device driver is read after rising of the OS, which is such that the starting from the external mass storage device can not be performed, do not occur. Therefore, free media conversion function which is an advantage of the floppy disk and a large storage capacity which is an advantage of the hard disk, can be realized at the same time, and the device may be advantageously utilized as a portable type device.

In addition, the virtual floppy region 18*b* of the magneto-optic recording playback device 18 of the present embodiment can perform file management in entirely the same way as a floppy disk drive by appropriating various kinds of utilities for the floppy disk drives use.

The present invention is not limited to only the embodiments described above, and various changes and modifications can be made. For example, if a hard disk drive (in particular, a removable hard disk drive) is used instead of the magneto-optic recording playback device (MO) as an external mass storage device in the embodiment described above, a hard disk drive, which is capable of being freely media exchanged can be constituted.

As hereinbefore fully described, according to the present invention, an external mass storage device having storage capacity exceeding that of a floppy disk is connected to a personal computer subjected to system-start-up by a system starting program stored in a storage medium such as a floppy disk and the like, by providing a virtual floppy disk region having the same storage capacity as a floppy disk on a part of the storage region of the external mass storage device, the system starting program being stored therein, and an auxiliary program being provided for reading the system starting program from the virtual floppy disk region at the time of system starting, thereby providing a system boot-up function and a media exchanging function in the external mass storage device, so that the media exchange of the external mass storage device can be performed freely after starting of the system.

What is claimed is:

1. A personal computer system comprising:
   a personal computer which is booted-up in accordance with a system boot-up program;
   an external mass storage device, external to said personal computer, having a storage region including a virtual floppy disk region which (a) has a storage capacity substantially similar to a storage capacity of a floppy disk and (b) stores said system boot-up program therein;

interface means for enabling communication between said personal computer and said external mass storage device;

storage means storing an auxiliary program; and read means for receiving said auxiliary program from said storage means and reading, in accordance with said auxiliary program, the system boot-up program from said virtual floppy disk region during system boot-up, said personal computer comprising means for booting-up said personal computer responsive to said system boot-up program read by said read means from said virtual floppy disk region.

2. A personal computer system according to claim 1, wherein said external mass storage device comprises a magneto-optic recording and playback device.

3. A personal computer system according to claim 2, wherein said storage means storing said auxiliary program comprises a system ROM internal to said personal computer.

4. A personal computer system according to claim 2, wherein said external mass storage device includes an interface circuit board which includes said storage means storing said auxiliary program.

5. A personal computer system according to claim 1, wherein said external mass storage device comprises a hard disk drive.

6. A personal computer system according to claim 5, wherein said hard disk drive is a removable hard disk drive.

7. A personal computer system according to claim 1, wherein said means storing said auxiliary program comprises a system ROM internal to said personal computer.

8. A personal computer system according to claim 1, wherein said external mass storage device includes an interface circuit board which includes said means storing said auxiliary program.

9. A personal computer system according to claim 1, wherein said storage region of said external mass storage device further comprises a user storage region for storing desired data.

10. A personal computer system according to claim 9, wherein said storage region of said external mass storage device further comprises a media-region management information storage region for storing management information regarding said user storage region and said virtual floppy disk region.

* * * * *